Feb. 3, 1970  A. W. LOHMANN  3,493,287
OPTICAL DETOUR PHASE SYSTEM
Filed April 26, 1966                                        2 Sheets-Sheet 1
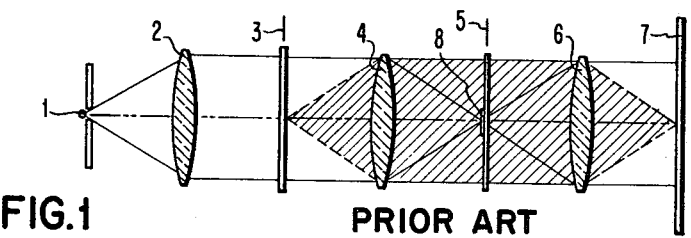
FIG.1  PRIOR ART
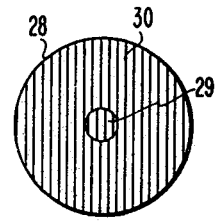
FIG.3
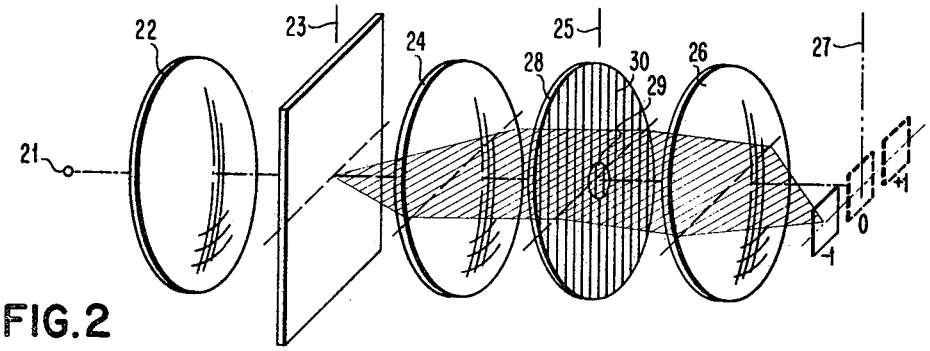
FIG.2
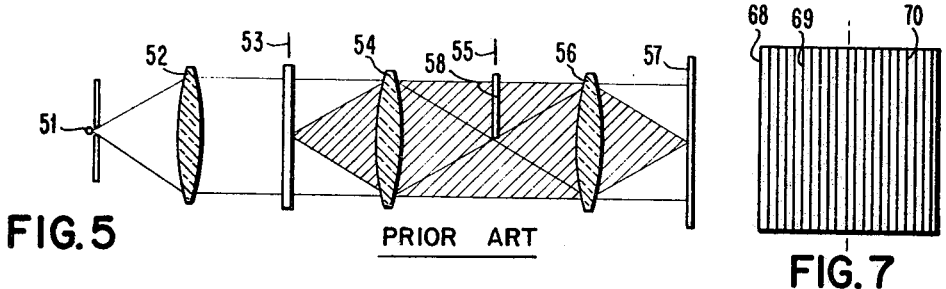
FIG.5  PRIOR ART
FIG.7
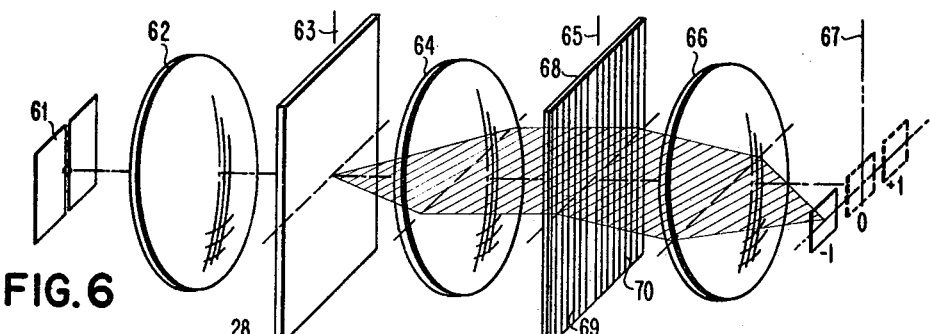
FIG.6
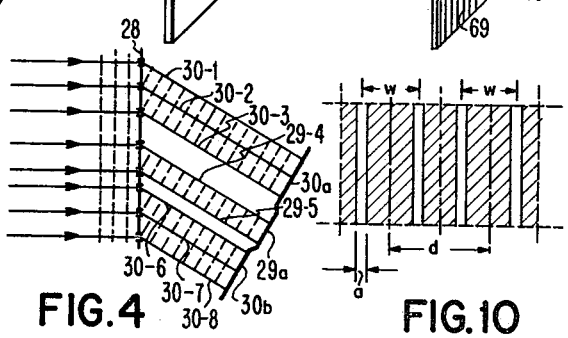
FIG.4        FIG.10
INVENTOR
ADOLF W. LOHMANN
By
ATTORNEY

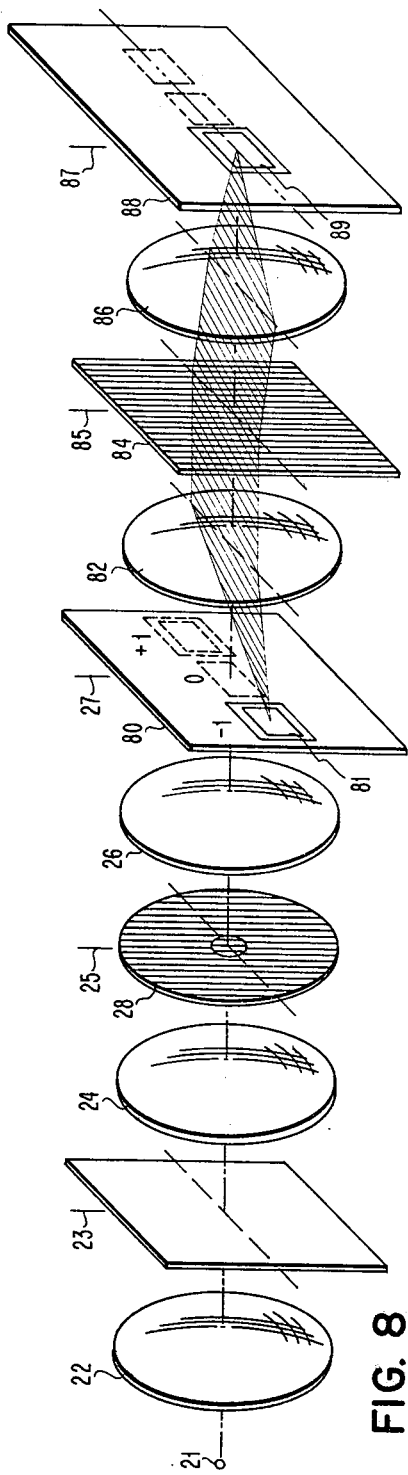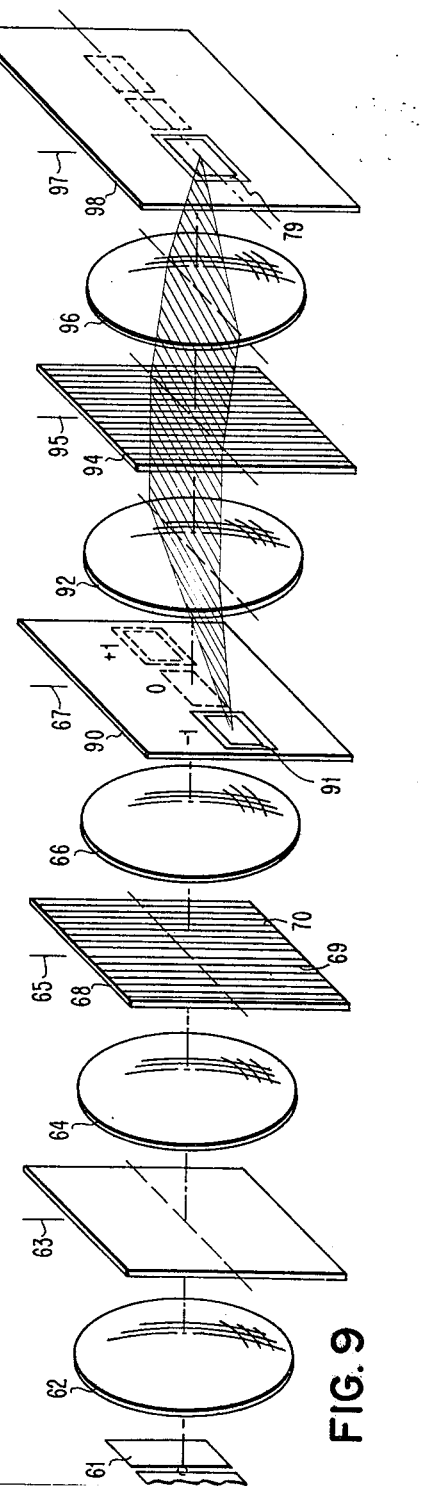

United States Patent Office 3,493,287
Patented Feb. 3, 1970

3,493,287
OPTICAL DETOUR PHASE SYSTEM
Adolf W. Lohmann, Los Gatos, Calif., assignor to International Business Machines Corporation, Armonk, N.Y., a corporation of New York
Filed Apr. 26, 1966, Ser. No. 545,378
Int. Cl. G02b 5/18
U.S. Cl. 350—162                                        3 Claims

ABSTRACT OF THE DISCLOSURE

A wavelength independent phase plate comprising a diffraction grating having first and second portions lying in a common plane and having parallel grating lines and the same grating constant. The portions are shifted, relative to each other, perpendicular to the grating lines and a fraction of the grating constant. When the light source is not monochromatic, it is desirable to employ a second diffraction grating having the same grating constant as the phase plate diffraction grating to correct lateral chromatic aberrations. The phase plate is useful, for example, in a phase contrast microscope.

---

This invention relates generally to optical systems and particularly to those systems which operate on images defined in terms of phase differences.

Certain objects have a high transparency and, while they introduce phase variations, they do not substantially alter the amplitude of the light used to illuminate the object. Such objects are invisible to amplitude sensitive viewing systems. Various techniques have been used to render such objects visible by converting the phase variations introduced by the object into amplitude variations. A normally invisible phase difference between the illuminating light and that diffracted by the object is commonly increased to $\lambda/2$ so that destructive interference effects may be utilized to view the object.

One such system is the phase contrast microscope. The principle of this microscope was disclosed by Zernike in 1934. A description of contemporary phase contrast microscopy appears in Chapter II of Progress in Microscopy, M. Francon, Row, Peterson & Company, Elmsford, N.Y., © 1961. Another system, particularly adapted to the viewing of Schlieren objects is the method of Wolter descrived in Encyclopedia of Physics, vol. 14, Springer, Heidelberg, Germany, 1956.

Both systems operate to shift the phase of the light diffracted by the object. In the phase shift microscope, a $\lambda/4$ phase shift occurs at the object and an additional $\lambda/4$ phase shift occurs by means of a dielectric phase plate. The Wolter system, on the other hand, utilizes a dielectric phase plate to shift the phase of one-half of the Fraunhofer spectrum by $\lambda/2$. In some Wolter systems the phase plate retards one half of the Fraunhofer spectrum by $\lambda/4$ and accelerates the other half of the Fraunhofer spectrum by $\lambda/4$ for a total difference of $\lambda/2$.

While both the phase microscope and the Wolter system are later discussed in greater detail, it is sufficient to note that the required phase shift is produced by a phase plate in each case. The use of a phase plate has several serious limitations. The phase shift produced by such a plate is described by the expression:

$$\frac{2\pi}{\lambda}(n-1)t$$

where:
$\lambda$ = wave length of the light;
$t$ = thickness of the plate;
$n = n(\lambda)$ the index of refraction.

The obvious shortcoming is that the phase shift is wavelength dependent since $\lambda$ occurs twice in the phase shift expression. Therefore, if optimum phase image enhancement is to be achieved, it is necessary to illuminate the object with monochromatic light. While such sources are known, they are generally less desirable for economic or convenience reasons. Further, if the light source is changed to another wavelength, it is necessary to use a different phase plate.

However, even if the monochromatic source is used, it is impossible to obtain the exact desired phase shift for rays which strike the plate at other than a predetermined angle. For example, the length of the path followed by a ray entering at an angle perpendicular to the surface of the plate will be exactly equal to the plate thickness. It can easily be seen that the path followed by rays entering at all angles other than 90° will be somewhat longer than the thickness of the plate thereby producing a differing phase shift.

It is therefore an object of my invention to provide a phase shift device which is independent of the wavelength.

It is another object of my invention to provide a phase shift device which provides a phase shift independent of the angle of incidence of the ray.

Another object of my invention is to provide a phase shift device which may be easily fabricated.

Still another object of my invention is to provide a means for selectively shifting the phase of an incident wave and correcting for aberrations introduced thereby.

Simply stated, the invention provides the desired phase shift by a grating type device. A parallel wave front incident on a diffraction grating is modified by the grating to produce a number of diffraction order images. Considering only the $-1$ diffraction order, the wave front which produces this image is inclined with respect to the grating so that the light making up the wave front is produced from successive slits across the grating. The angle is such that the first wave to strike the grating, and transmitted by the first slit, is reinforced by the second wave to strike the grating and transmitted by the second slit, etc. Thus, the slits operate to progressively delay each incident wave exactly one wavelength. The delay will always be one wavelength. The foregoing is true for a uniform grating. Consider now the effect of a second grating, having the same slit spacing (grating constant), but slightly out of lateral orientation with the first grating. In other words, there is a separation between the adjacent slits of the first and second grating which differs from the grating constant. If the spacing is greater than the grating constant, the phase of the diffracted wave from the second grating in the direction toward the second grating will be leading the phase of the first grating. Conversely, the phase of the wave diffracted toward the first grating will be delayed. The significant fact is that the phase shift is $2\pi\Delta(x)/d$ where $\Delta(x)$ represents the deviation of the second grating from perfect orientation with the first grating and $d$ is the grating constant. This relationship holds for all wavelengths since $\lambda$ does not appear. Furthermore, if other than the 1st diffraction order image is used, the phase shift is larger by a factor of $m$ when $m$ is the selected diffraction order. It may also be seen that the phase shift expression does not contain a term related to the angle of incidence, thereby avoiding one of the inherent problems with a phase plate.

Thus, to selectively phase shift portions of an incident wave, the various portions are made to fall on diffraction gratings which are out of alignment by predetermined amounts and the 1st or higher order diffraction images are used.

It has been emphasized that the phase shift is completely independent of wavelength; however, the diffraction angle is not. Thus, if other than monochromatic light is used, there will be a lateral chromatic aberration. The longer wavelength radiation will be diffracted through a larger angle and therefore imaged at a greater distance from the optical axis than the shorter wavelength radiations. This aberration may be corrected by introducing a third optical grating system having a grating constant equivalent to that used to selectively phase shift the incident wave. By equivalent it is meant that allowance is made for variations in the focal length of the lenses in the system.

The third grating provides a diffraction angle which is wavelength dependent, but opposite in direction to that of the phase shift grating. By utilizing the third grating to compensate for the chromatic aberrations produced by the first and second gratings, a full chromatic correction is achieved.

The foregoing and other objects, features and advantages of the invention will be apparent from the following more particular description of preferred embodiments of the invention, as illustrated in the accompanying drawings.

FIG. 1 is a diagram of a typical prior art phase contrast microscope system.

FIG. 2 is a diagram of a phase contrast microscope embodying the invention.

FIG. 3 is a detail of the phase plate used in the system of FIG. 2.

FIG. 4 is illustrative of the geometry of the phase shift provided by the invention.

FIG. 5 is a diagram of the Schlieren system of Wolter.

FIG. 6 is a diagram of a Wolter Schlieren system embodying the invention.

FIG. 7 is a detail of the phase plate used in the system of FIG. 6.

FIG. 8 is a diagram of a phase contrast microscope with detour phase and chromatic aberration correction according to the invention.

FIG. 9 is a diagram of a Wolter Schlieren system with detour phase and chromatic aberration correction according to the invention.

FIG. 10 describes a grating formed from a number of individual cells.

Considering first the phase contrast microscope embodiment, a typical prior art system is shown in FIG. 1. A monochromatic point source of illumination 1 is collimated by lens 2 to provide a plane wave at the object 3. Lens 4 provides an image of the source at Fraunhofer plane 5. Rays diffracted by object 3 are brought to a focus at the image plane 7 by means of lens 4 and lens 6. The object 3 is assumed to be transparent as is often the case in medical applications. The phase object has a complex amplitude transmission:

$$u_0(x) = e^{i\alpha(x)}$$

For small phase angles:

$$|\alpha| \ll \pi$$

$$u_0(x) \approx 1 + i\alpha(x)$$

The image shows no contrast because the intensity is uniform $$I(x) = |u_0(x)|^2 = 1$$

$$|u(x)|^2 = |e^{i\alpha(x)}|^2 = 1$$

Fraunhofer diffraction takes place between the object plane 1 and the image plane 7. First, when the light goes from the object plane to the Fraunhofer plane, and second when the light goes from the Fraunhofer plane to the image plane. This may be described by a Fraunhofer transformation. The "1" in $u_0(x) \approx 1 + i\alpha(x)$ is a constant which creates a light peak in the center of the Fraunhofer plane 5. This is the so-called direct or undiffracted light. A phase plate 8 having a small piece of phase retarding material is put at the center of the Fraunhofer plane 5. The phase plate 8 has a thickness which provides a $\pi/2$ phase delay for the wavelength of source 1, together with an amplitude reduction factor $a$.

The complex image amplitude is:

$$-ia + i\alpha x$$

and the intensity is:

$$|-ia + i\alpha(x)|^2 = [-a + \alpha(x)]^2 \approx a^2 [1 - 2/a\alpha(x)]$$

Thus, the phase, $\alpha(x)$ of the object, is converted into an intensity variation in the phase contrast image.

To describe the foregoing system in another manner, it may be stated that the rays shown in the shaded area represent the diffracted rays from a point in the object plane 3. It is noted that only a small portion of these rays are incident on the phase plate 8. On the other hand, the source image coincides with phase plate 8 so that the phase plate transmits primarily direct radiation. As mentioned previously, the object produced diffraction causes the diffracted wave to lag the direct wave by $\pi/2$. Similarly, the phase plate 8 causes the direct wave to lead the diffracted wave by $\pi/2$. At the image plane 7 the two waves are $\pi$ out of phase or $\lambda/2$ resulting in destructive interference. While phase plate 8 transmits some of the object diffracted light, the size of the plate is such that a relatively small proportion of the diffracted light is affected. Almost all of the direct radiation passes through the phase plate.

This system has the disadvantage that monochromatic light must be used at source 1 and the phase shift by phase plate 8 is not uniform due to the variations in the angle of incidence of the undiffracted rays. A further disadvantage is the necessity for changing phase plates when a different wavelength source is used.

A phase contrast microscope system incorporating the invention is shown in FIG. 2. A point source 21 is collimated by lens 22 to provide a plane wave at object 23. Lens 24 provides an image of source 21 at the center portion of Fraunhofer plane 25. Rays diffracted by points in object 23 are brought to focus in image plane 27 by lens 24 and lens 26.

The phase plate 28 in Fraunhofer plane 25 is shown in full view of FIG. 3. The center portion 29 and outer portion 30 comprise diffraction gratings having the same grating constant. The center portion 29 is shown to be slightly misaligned with respect to the outer portion 30.

The effect of this misalignment or displacement on the transmitted wave is illustrated in FIG. 4. A section view of the wave front which makes up the 1st diffraction order is shown. The outer portions of the wave 30a and 30b are in phase since they are produced by the same diffraction grating. The inner portion of the wave 29a leads the remainder of the wave and may be considered to have been phase shifted. The amount by which the phase of the two portions is altered for the 1st diffraction order is defined:

$$\Delta\phi = 2\pi\Delta x/d$$

where:

$\Delta\phi$ = resultant phase shift;
$\Delta x$ = shift of the grating;
$d$ = grating constant (distance between slits)

For the $m^{th}$ order the expression becomes:

$$\Delta\phi = 2\pi\Delta x m/d$$

A close examination of FIG. 4 reveals the nature of the phase shift mechanism. Since the 1st diffraction order is caused by reinforcement, at 1 wavelength interval of the diffracted waves from successive slits, there is a uniform $\lambda$ delay in the light from successive slits. Looking at it another way, assume the top slit in FIG. 4 is number 1, the next lower number 2, etc. The first wave to strike the grating will be diffracted by all the slits. Consider the wave along the line 30–1. When this wave has traveled one wavelength, the second wave strikes the grating. Note that the portion of the wave diffracted at slit 2 along line 30–2 is in phase with the wave along 30–1 and reinforces it. Since the slit 3 is uniformly spaced from slit 2, the portion of third wave which strikes the grating and is diffracted by slit 3 along line 30–3 further reinforces the wave which makes up 30a.

Now, the action at the fourth slit is considered. This slit is a greater distance from slit 3 than slit 3 is from slit 2. For this reason, the portion of the fourth wave to strike the grating, and be diffracted along line 29–4, is detoured and slightly in advance of where it would have been if the normal spacing existed between slits 3 and 4. This advanced wave front is reinforced by the portion of the fifth wave to strike the grating and be diffracted along line 29–5.

The sixth slit is spaced closer to slit 5 than the normal spacing. Accordingly, the portion of the sixth wave to strike the grating and be diffracted along line 30–6 is slightly behind where it would have been if the sixth slit had been in the normal position with respect to the fifth slit. However, it is in phase with the wave front generated from slits 1, 2 and 3 since split 6 is properly oriented with respect to these slits.

It will be appreciated that a maximum of $\lambda/2$ effective phase shift may be achieved in this manner, thus equaling the maximum shift achievable with the conventional phase plate.

In the embodiment of FIG. 2, the phase plate at the Fraunhofer plane 25 operates to phase shift the light which passes through first portion 29 and forms a 1st order diffraction image, $\lambda/4$, from the light which passes through the second portion 30 and forms a 1st order diffraction image. The source 21 is imaged at plane 25 and therefore, most of the direct radiation passes through first portion 29 of the phase plate. The major portion of diffracted light from object plane 23 passes through second portion 30 of the phase plate.

The resulting interference pattern between the 1st order diffraction image and the direct illumination represents an amplitude portrayal of the phase differences produced at the object plane 23 and renders the phase type object visible.

A second application for the detour phase plate is the observation of Schlieren objects. Examples of Schlieren objects include non-flat glass, non-homogeneous glass and temperature or pressure created inhomogeneities in a gas. One Schlieren method is that of Wolter as shown in FIG. 5.

A slit source 51 is collimated by lens 52 to provide a plane wave at object 53. Lens 54 provides an image of source 51 in the Fraunhofer plane 55. Lens 56 cooperates with lens 54 to create an image of object 53 in the image plane 57. A $\lambda/2$ dielectric phase plate 58 is placed in the Fraunhofer plane 55 so that one half of the Fraunhofer spectrum is phase shifted $\lambda/2$. This causes cancellation of the illuminating light (direct radiation) by destructive interference. One-half of the light which is diffracted by object 53 passes through the phase plate 55 to be phase shifted $\lambda/2$. The phase shifted portion of the diffracted light is combined with the unaltered portion of the diffracted radiation at image plane 57 to create an interference pattern. Note that the effect at object 53 is primarily one of diffraction and no phase shift need occur. Thus the system may be used to observe changesg in index of refraction, thickness or homogeneity which cause prismatic deflection of light.

This system contains the same basic limitations that were discussed with regard to the phase contrast microscope: specifically, the requirement for a monochromatic source and the fact that the phase shift provided by phase plate 55 is incidence dependent. Furthermore, the phase plate would have to be replaced when $\lambda$ is changed.

A Schlieren system embodying the invention is shown in FIG. 6. A slit source 61 is collimated by lens 62 to provide a plane wave at object 63. Lens 64 operates to provide an image of source 61 in the Fraunhofer plane 65. Rays diffracted by points in the object plane 63 are brought to a focus by lenses 64 and 66 in the image plane 67.

The phase plate 68 in Fraunhofer plane 65 is shown in full view in FIG. 7. It may be seen that a first portion 69 and a second portion 70 comprise optical gratings having the same grating constant but being slightly out of perfect orientation with respect to each other. The spacing between adjacent slits in the center of the plate is greater than the grating constant.

Phase plate 68 operates to create a $\lambda/2$ phase difference between the incident wave diffracted by the portion 69 and the portion 70. The mechanism by which this phase shift is accomplished is the same as described with respect to the system shown in FIGS. 2, 3 and 4.

Since the image of source 61 is positioned along the junction between portions 69 and 70 of phase plate 68, the wider space between adjacent slits will block transmission of the source image. The 0 order image will have no phase modification. The waves comprising the $+1$ and $-1$ diffraction orders from portions 69 and 70 will be $\lambda/2$ out of phase. If the $+1$st wave from portion 69 leads that from portion 70, then the $-1$st portion 70 leads that from portion 69. The direct radiation imaged at phase plate 68 will be uniformly cancelled out at the image plane 67 as described above or by destructive interference.

The radiation diffracted by object 63 is not uniformly distributed when it passes through Fraunhofer plane 65. Thus, the interference pattern of the first diffraction order waves from the respective portions of phase plate 65 will represent the slope, discontinuities, etc. of the object.

Either the $-1$ or $+1$ diffraction order image may be observed. The only difference will be in the appearance of the image. The same contrast will exist in each. The 0 order gives an ordinary image, which is convenient for comparison.

As mentioned previously, the phase shift provided by the detour phase plate is completely independent of wavelength. However, the angle of the diffracted ray is wavelength dependent, which will cause lateral chromatic aberrations, unless the light is monochromatic.

A second image-forming means which simultaneously corrects for all wavelengths is shown in FIG. 8. The structure to the object side of image plane 27 is identical to that of FIG. 2 and the same reference characters are used. Plane 27 contains a screen 80 having a window 81 which may be positioned to transmit the selected one of the diffraction images. Assuming, as shown, that the $-1$ order diffraction image is selected, lens 82 performs a Fraunhofer diffraction of the intermediate image. A compensating grating 84, having the same effective grating constant as the phase plate, is positioned in the Fraunhofer plane 85. The light incident on grating 84 is diffracted in the same manner as that which is diffracted by phase plate 28. Lens 86 creates the diffracted images in the image plane 87. The screen 88 has a window 89 which allows the $-1$ order diffraction image, located on the optical axis, to be viewed. In this manner the increased deviation of longer wavelengths away from the optical axis at grating 28 is compensated for by a corresponding increased deviation of the longer wavelengths toward the optical axis at grating 84.

The application of this means for correcting lateral chromatic aberrations results in a reduced theoretical efficiency of the system. This is due to the $1/\pi^2$ intensity loss at each diffraction grating. However, the second image-forming system which includes lenses 82 and 83, together with compensating grating 85, allows the use of broad band sources of high intensity. This system of correcting the lateral chromatic aberrations therefore results in a brighter image despite the reduced theoretical efficiency for monochromatic light.

The lateral chromatic aberrations in the system of FIG. 6 may be corrected in a similar manner as shown in FIG. 9.

The structure to the object side of image plane 67 is identical to that of FIG. 6 and the same reference characters are used. Plane 67 contains a screen 90 having a window 91 which may be positioned to transmit selected one of the diffraction images. Assuming that the −1 order is selected, lens 92 performs a Fraunhofer diffraction of the intermediate range. A compensating grating 94 having the same effective grating constant as the phase plate 68 is positioned at the Fraunhofer plane 95. If all lenses are of the same focal length as shown, the slit spacing for gratings 68 and 94 may be the same. If lenses of differing focal lengths are used it may be necessary to compensate by changing the slit spacing in either grating 68 or 94 to maintain the same effective grating constant.

The light incident on grating 94 is diffracted in the same manner as that which is diffracted by phase plate 68. Lens 96 creates the diffracted images in the second image plane 97. A screen 98 has a window 99 which allows the −1 diffraction order image, located on the optical axis, to be viewed. In this manner, the increased deflection of longer wavelengths by grating 68 is cancelled but by an equal but reversed increased deflection of longer wavelengths by grating 94.

The foregoing method of phase alteration lends itself particularly well to the simultaneous modification of amplitude as well. For example, in FIG. 2, the diffracted wave amplitude is related to the slit width of grating 28 in the following manner:

$$\text{Amplitude} = \operatorname{Sin}(\pi ma/d)$$

where:
$m$ = the observed diffraction order image;
$a$ = the slit width;
$d$ = the grating constant In the phase contrast microscope it is sometimes desirable to control the relative amplitudes of the direct and object diffracted radiation. This can easily be done by proportioning the slit widths in portions 29 and 30 of grating 28 according to the expression:

$$\frac{\text{Amplitude (direct)}}{\text{Amplitude (diffracted)}} = \frac{\operatorname{Sin}\left(\frac{\pi m a_0}{d}\right)}{\operatorname{Sin}\left(\frac{\pi m a_1}{d}\right)}$$

where:
$a_0$ = the slit width of portion 29 of phase plate 28,
$a_1$ = the slit width of portion 30 of phase plate 28.

An alternative method of amplitude control incorporates the principles described in my copending application, Ser. No. 456,127 "Complex Spatial Filter Consisting of Binary Elements" and assigned to the assignee of this application, now abandoned. In that application it is shown that a grating may be formed from a number of individual cells such as shown in FIG. 10.

The distance between the center of the cells is the grating constant $d$. The diffracted wave amplitude from a grating of such cells is:

$$\text{Amplitude} = \operatorname{Cos}\left(\frac{\pi m w}{d}\right) \sin\left(\frac{\pi m a}{d}\right)$$

where $w$ = the separation between the slits in an individual cell and $a$ = the slit width. The relative amplitudes of the waves diffracted from portions 29 and 30 of a grating 28 made of such cells follows:

$$\frac{\text{Amplitude (direct)}}{\text{Amplitude (diffracted)}} = \frac{\operatorname{Cos}\left(\frac{\pi m w_0}{d}\right) \sin\left(\frac{\pi m a}{d}\right)}{\operatorname{Cos}\left(\frac{\pi m w_1}{d}\right) \sin\left(\frac{\pi m a}{d}\right)}$$

It will be appreciated that certain techniques for the fabrication of gratings lend themselves better to the second or cell type method of amplitude control. For example, a plotter controlled by a computer could be used to develop the desired grating. Such plotters are able to draw lines of varying thickness only by repetitive marking. It is therefore simpler to use a constant line or slit width and control amplitude by the slit spacing within the cells.

The foregoing description of the invention has been confined to objects which are viewed by transmitted light, but the system is equally applicable to objects viewed by reflected light. To view such images the source and the viewing apparatus would be positioned on the same side of the object in the conventional manner.

While the invention has been particularly shown and described with reference to preferred embodiments thereof, it will be understood by those skilled in the art that the foregoing and other changes in form and details may be made therein without departing from the spirit and scope of the invention.

What is claimed is:
1. In an image processing system, the combination comprising the following elements, all aligned along a common optical axis;
  a source of radiation, said radiation being directed toward an object;
  first means for forming a first Fraunhofer diffraction plane of said radiation coming from said object,
  a phase plate located at the first Fraunhofer plane comprising a first diffraction grating having first and second portions lying in a common plane and having parallel grating lines,
  said first and second portions having the same grating constant,
  said portions being shifted, relative to each other, perpendicular to their grating lines and a fraction of of the grating constant, whereby a relative phase shift will be induced in the radiation passing through said first and second portions,
  first means for forming an image of said diffracted radiation at a first image plane,
  screen means located at said first image plane for transmitting a selected one of the diffraction images formed by said first image forming means and for blocking the remainder of said radiation,
  second means for forming a second Fraunhofer diffraction plane from the radiation passing through said screen means,
  a second diffraction grating located at said second Fraunhofer plane and having the same effective grating constant as the grating constant of said first diffraction grating, and
  second means for forming an image of said diffracted radiation at a second image plane, whereby lateral chromatic aberrations in the first and higher order diffraction images are corrected.

2. The system according to claim 1 wherein the first portion of said first diffraction grating transmits approximately one-half of the Fraunhofer plane and the second portion of said first diffraction grating transmits the other half of the Fraunhofer plane, and wherein the fraction of the grating constant, which the first and second portions are shifted, is one-half of the constant, whereby the phase shift in the radiation induced by the phase plate is $\lambda/2$.

3. The system according to claim 1 wherein the fraction of the grating constant, which the first and second portions of the first diffraction grating is shifted, is one-fourth of the constant, whereby the phase shift in the radiation induced by the phase plate is $\lambda/4$.

References Cited

UNITED STATES PATENTS 2,427,689  9/1947  Osterberg et al. _____ 350—13

(Other references on following page)

OTHER REFERENCES

Hauk et al., Optik, vol. 15, No. 5; May, 1958, pp. 275–277.

Holder et al., Schlieren Methods, Notes on Applied Science No. 31, National Physical Laboratory, England, 1963, pp. 31–32.

DAVID SCHONBERG, Primary Examiner

RONALD J. STERN, Assistant Examiner

U.S. Cl. X.R.

350—13; 356—129